US011915600B2

(12) United States Patent
Kanda

(10) Patent No.: US 11,915,600 B2
(45) Date of Patent: Feb. 27, 2024

(54) FLIGHT DEVICE, METHOD FOR CONTROLLING FLIGHT DEVICE, PROGRAM FOR CONTROLLING FLIGHT DEVICE, AND STRUCTURE FOR FORMING PATH OF FLIGHT DEVICE

(71) Applicant: KYOCERA Corporation, Kyoto (JP)

(72) Inventor: Toi Kanda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 289 days.

(21) Appl. No.: 17/052,292

(22) PCT Filed: Apr. 23, 2019

(86) PCT No.: PCT/JP2019/017260
§ 371 (c)(1),
(2) Date: Nov. 2, 2020

(87) PCT Pub. No.: WO2019/230267
PCT Pub. Date: Dec. 5, 2019

(65) Prior Publication Data
US 2021/0053673 A1 Feb. 25, 2021

(30) Foreign Application Priority Data
May 29, 2018 (JP) ................................ 2018-102535

(51) Int. Cl.
*G08G 5/00* (2006.01)
*G08G 5/04* (2006.01)

(52) U.S. Cl.
CPC ......... *G08G 5/0069* (2013.01); *G08G 5/0078* (2013.01); *G08G 5/045* (2013.01)

(58) Field of Classification Search
CPC .......................... B64C 13/18; B64C 2201/146
See application file for complete search history.

(56) References Cited

U.S. PATENT DOCUMENTS

| | | | | |
|---|---|---|---|---|
| 9,104,201 | B1 * | 8/2015 | Pillai | G08G 5/045 |
| 10,750,733 | B1 * | 8/2020 | Garner | B64D 47/02 |
| 2015/0284010 | A1 * | 10/2015 | Beardsley | G08G 1/096816 701/1 |
| 2016/0117931 | A1 | 4/2016 | Chan et al. | |
| 2016/0203723 | A1 * | 7/2016 | Kube | G08G 5/0026 701/3 |
| 2016/0378109 | A1 | 12/2016 | Raffa et al. | |
| 2017/0076354 | A1 * | 3/2017 | High | G08G 5/0069 |
| 2018/0012504 | A1 * | 1/2018 | van Cruyningen | G08G 5/0069 |
| 2018/0290748 | A1 * | 10/2018 | Corban | G02B 27/017 |
| 2019/0072949 | A1 * | 3/2019 | Charalambides | G05D 1/101 |
| 2019/0112046 | A1 * | 4/2019 | Lery | B61L 23/04 |
| 2019/0172358 | A1 * | 6/2019 | Zhou | B64C 39/024 |
| 2020/0207474 | A1 * | 7/2020 | Foggia | G05D 1/0676 |

(Continued)

FOREIGN PATENT DOCUMENTS

| | | |
|---|---|---|
| JP | H11294098 A | 10/1999 |
| JP | 2004092391 A | 3/2004 |

(Continued)

*Primary Examiner* — Amelia Vorce
(74) *Attorney, Agent, or Firm* — Studebaker & Brackett PC

(57) ABSTRACT

Provided is a flight device that performs, on the basis of a determination that a distance to another flight device is within a predetermined distance, a predetermined avoidance action to avoid the other flight device.

8 Claims, 3 Drawing Sheets

(56) References Cited

U.S. PATENT DOCUMENTS

| | | | | |
|---|---|---|---|---|
| 2020/0409357 | A1* | 12/2020 | Bash | G08G 5/0043 |
| 2021/0065566 | A1* | 3/2021 | Li | G08G 5/0082 |
| 2022/0051577 | A1* | 2/2022 | Ali | G08G 5/0043 |

FOREIGN PATENT DOCUMENTS

| | | | | | |
|---|---|---|---|---|---|
| JP | 2004175209 | A | | 6/2004 | |
| JP | 2005060968 | A | | 3/2005 | |
| JP | 2017022574 | A | | 1/2017 | |
| JP | 2018001967 | A | | 1/2018 | |
| JP | 2018043815 | A | * | 3/2018 | B65G 1/00 |
| WO | WO-2015175379 | A1 | * | 11/2015 | G05D 1/0088 |

* cited by examiner

FLIGHT DEVICE, METHOD FOR CONTROLLING FLIGHT DEVICE, PROGRAM FOR CONTROLLING FLIGHT DEVICE, AND STRUCTURE FOR FORMING PATH OF FLIGHT DEVICE

CROSS-REFERENCE TO RELATED APPLICATION

This application claims priority to and benefit of Japanese Patent Application No. 2018-102535 filed on May 29, 2018, the entire contents of which are incorporated herein by reference.

TECHNICAL FIELD

This disclosure relates to a flight device, a method for controlling a flight device, a program for controlling a flight device and a structure for forming a path of a flight device. In particular, this disclosure relates to a flight device such as a drone, a method for controlling such a flight device, a program for controlling such a flight device and a structure for forming a path of such a flight device.

BACKGROUND

In recent years, typically unmanned flight devices, such as drones, have become rapidly popular. For example, a flight device such as an unmanned small multi-copter equipped with an imaging device such as a camera is commercially available. According to such a flight device, it is possible to capture a still image or a moving image from a place where a person cannot easily reach. For example, Patent Literature 1 (PTL 1, JP2018-001967A) discloses an unmanned aerial vehicle that inspects enclosed spaces such as sewage pipeline facilities. PTL 1 discloses that video data or image data captured by a camera for the unmanned aerial vehicle is displayed on a screen of a controller for the unmanned aerial vehicle. It is expected that such an unmanned small flight device will become more popular in the future with expansion of applications and the progress in legal development.

SUMMARY

A flight device according to an embodiment performs, on the basis of a determination that a distance to another flight device is within a predetermined distance, a predetermined avoidance action to avoid the other flight device.

A method for controlling a flight device according to an embodiment includes:

- a determination step of determining whether or not a distance from the flight device to another flight device is within a predetermined distance; and
- an avoidance step of performing, on the basis of a determination in the determination step, a predetermined avoidance action in which the flight device avoids the other flight device.

A program for controlling a flight device according to an embodiment causes a computer to execute:

- a determination step of determining whether or not a distance from the flight device to another flight device is within a predetermined distance; and
- an avoidance step of performing, on the basis of a determination in the determination step, a predetermined avoidance action in which the flight device avoids the other flight device.

A structure for forming a path of a flight device according to an embodiment is a structure configured to form at least partially a flight path of the flight device.

The structure has an evacuation space for the flight device to avoid the other flight device.

BRIEF DESCRIPTION OF THE DRAWINGS

In preparation for the environment where the number of flight devices flying in the air increases with the spread of the above-described flight device, it is desirable to take measures from the viewpoint of safety, etc. Further, if the flight device can be safely flown to a predetermined place, the convenience in operating the flight device can be improved. This disclosure relates to provide a flight device that contributes to safety and convenience, a method for controlling the flight device, a program for controlling the flight device and a structure configured to form a path of the flight device. According to an embodiment, a flight device that contributes to safety and convenience, a method for controlling the flight device, a program for controlling the flight device and a structure configured to form a path of the flight device can be provided.

A flight device according to an embodiment and a structure according to an embodiment will be described in detail below with reference to the drawings.

The flight device according to an embodiment may be a flight device that can fly and/or float in the air. Here, the flight device may typically be an unmanned small flight device such as a drone, for example. Further, a structure according to an embodiment may be a structure configured to form a path of a flight device such as a drone, for example, and may typically be a structure configured to form at least partially a flight path of a flight device such as a drone, for example.

Figure 1:
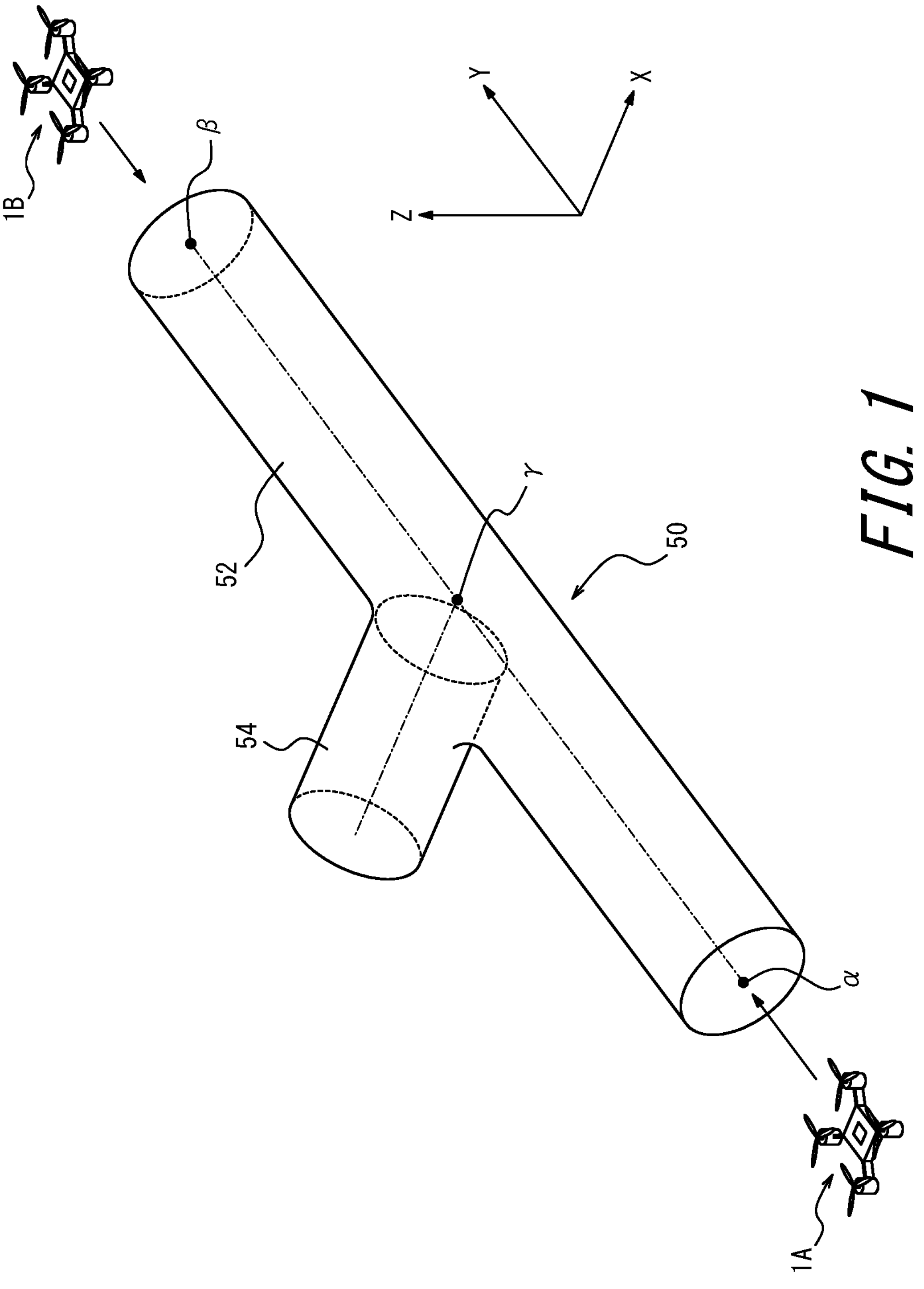
FIG. 1 is a perspective view illustrating an appearance of a flight device according to an embodiment and a structure configured to form a path of the flight device.

FIG. 1 is a perspective view illustrating a flight device according to an embodiment along with a structure configured to form a path of the flight device. In the following description, the Z-axis positive direction illustrated in the figure is the "upward" direction and the Z-axis negative direction is the "downward" direction. Here, the "downward" direction may typically be vertical.

FIG. 1 illustrates a flight device 1A and a flight device 1B as examples of the flight device according to an embodiment. Hereinafter, when the flight device 1A and the flight device 1B are not distinguished, they may be simply referred to as "flight devices 1." In the following description, only the flight device 1A may be the flight device according to an embodiment, or both the flight device 1A and the flight device 1B may be the flight device according to an embodiment. Further, the flight device 1A and the flight device 1B may be the same type or different types. Further, the flight device 1A and the flight device 1B may be the same or different in shape, size, flight speed, or the like.

As illustrated in FIG. 1, the flight device 1 according to an embodiment may be a device having various flying functions that allow the flight device 1 to float in the air even if the moving speed thereof in the horizontal direction is low. For example, the flight device 1 may typically be an unmanned small helicopter, a multi-copter, a drone, an airship, a balloon, or an Unmanned Aerial Vehicle (UAV). Here, the drone is not limited to military UAVs and may be used for various purposes other than the military purposes. For example, the drone may have a CCD image sensor and include an application of capturing images during a flight. Further, the drone may include, for example, an application of transporting parts used in a factory from one place to another. Moreover, in an embodiment, the flight device 1 may be remotely controlled by radio or autonomously controlled (autopilot). Further, the flight device 1 may be remotely controlled (autopilot) by radio from an external device, for example.

The flight device 1 is not limited to the one lustrated in FIG. 1 and may be any flight device. In the following description, an example will be given where the flight device 1 is a drone including one or more propellers (which may be blades or rotors) such as four propellers illustrated in FIG. 1. Configuration of each functional portion of the flight device 1 according to an embodiment will be further described below.

Further, as illustrated in FIG. 1, a structure 50 according to an embodiment has a path 52 and an evacuation space 54. The structure 50 according to an embodiment forms the path 52 of a flight device such as the flight device 1, for example. Here, the structure 50 does not necessarily have to entirely form the path 52 along which the flight device 1 flies, but may at least partially form the path 52 of the flight device 1. In the structure 50 according to an embodiment, the path 52 forms a space in which a flight device such as the flight device 1 can fly and/or float. Further, a part or all of the path 52 of the structure 50 may be buried in the ground.

In an embodiment, the path 5:2 may have a hollow structure with a size (diameter) suitable for the flight device 1 to fly and/or float. Specifically, for example, when the flight device 1A has a size of about 40 cm square (size in the XY plane), the path 52 may be configured as a cylindrical structure having a diameter of 1.5 m, for example. Further, the path 52 of the structure 50 is not necessarily limited to the cylindrical path (the cross section parallel to the XZ plane is circular). The inner wall of the path 52 may have any shape that does not prevent the flight device 1 from flying and/or floating. For example, the inner wall of the path 52 may be configured such that the cross section parallel to the XZ plane is square or rectangular, or any polygonal or oval. Furthermore, the outer wall of the path 52 may have any shape so that (the inside of) the path 52 is protected with a certain strength, for example, as needed, when the structure 50 is formed.

In an embodiment, the path 52 may be composed of a material of moderate strength such as iron or aluminum, glass, concrete, carbon graphite, etc., or any combination thereof. Further, the path 52 may be made of a material such as a synthetic resin as long as it can maintain a certain level of strength. In an embodiment, the path 52 may be made of any material as long as it can maintain strength as a flight path for a flight device such as the flight device 1A.

As illustrated in FIG. 1, the structure 50 can guide the flight device 1A into the path 52 with the position α of the path 52 as an entrance. In this case, the structure 50 can discharge the flight device 1A from the path 52 with the position β of the path 52 as an outlet. Therefore, the flight device 1A can pass through the path 52 of the structure 50 in most of the section from the starting point to the destination by extending the position β of the path 52 to the vicinity of the destination of the flight device LA.

Here, the path 52 of the structure 50 does not necessarily have to be enclosed over its entire length. For example, the path 52 of the structure 50 may be partially formed with holes or may be partially opened to the outside. Furthermore, the path 52 of the structure 50 may be composed of only a skeleton that is mostly uncovered. In an embodiment, the path 52 may be formed with a door and/or a window connecting the outside and the inside.

However, by configuring the path 52 of the structure 50 to be mostly closed (enclosed), the flight device 1A is less susceptible to the effects of the external environment, such as rain, wind or dust, when flying in the path 52. Further, when the path 52 of the structure 50 is mostly enclosed, noise leaking to the outside when the flight device 1A flies is reduced. Further, such a structure allows the path 52 of the structure 50 to be a dedicated path for the flight device such as the flight device 1A, and can also reduce the risk of humans or other animals entering and hindering the flight device frons flying. Furthermore, such a structure reduces the risk of injury to humans or other animals if the flight device 1A falls or crash-lands due to a malfunction or the like. Moreover, such a structure also reduces the impact of flight devices on the cityscape, even if a large number of flight devices, such as the flight device 1A, become popular.

Furthermore, the structure 50 may be configured such that a predetermined position in the path 52 can be opened and closed while enclosing most part of the path 52. With such a configuration, even if the flight device falls or makes an emergency landing on the path 52, for example, due to a malfunction, the maintenance personnel can easily recover the flight device 1A.

As illustrated in FIG. 1, for example, the flight device 1B can also fly through the path 52 of the structure 50, like the flight device 1A. For example, as illustrated in FIG. 1, the structure 50 can guide the flight device 1B into the path 52 with the position β of the path 52 as an outlet. In this case, the structure 50 can discharge the flight device 1B from the path 52 with the position α of the path 52 as an outlet. Therefore, by extending the position α of the path 52 to the vicinity of the destination of the flight device 1B, the flight device 1B can also pass through the path 52 of the structure 50 in most part of the flight section from the starting point to the destination.

However, as illustrated in FIG. 1, if the flight device 1B also attempts to move forward in the path 52 (e.g. in the Y-axis negative direction) while the flight device 1A moves forward in the path 52 (e.g. in the Y-axis positive direction), the risk of contact or collision between the two devices in the path 52 will increase, Therefore, as illustrated in FIG. 1, the structure 50 according to an embodiment may have an evacuation space 54 for one flight device to avoid the other flight device. For example, suppose the flight device 1A determines that a distance to the flight device 1B will be a predetermined distance or less when continuing to move forward. In this case, the flight device 1A changes its path, for example, to the left (in the X-axis negative direction) at the position γ of the path 52 and evacuates to the evacuation space 54, In this manner, the flight device 1A can maintain its path and avoid the flight device 1B that moves forward. Similarly, suppose that the flight device 1B determines that the distance to the flight device 1A will be the predetermined distance or less when continuing to move forward. In this case, the flight device 1B changes its path to the right (X-axis negative direction), for example, at the position γ of the path 52 and evacuates to the evacuation space 54. In this manner, the flight device 1B can maintain its path and avoid the flight device 1A that moves forward.

In an embodiment, the evacuation space 54 may have any size (diameter) and shape to be suitable for the flight device 1 to evacuate. Further, in an embodiment, the evacuation space 54 may be composed of any material such as iron or aluminum, glass, concrete, carbon graphite, or synthetic resin or the like, or any combination thereof so as to be suitable for a flight device such as the flight device 1A to evacuate. Further, the evacuation space 54 does not necessarily have to be entirely enclosed as illustrated in FIG. 1, and may be partially formed with holes or partially opened to the outside. Moreover, in an embodiment, the evacuation space 54 does not necessarily have to be a hollow structure, and may be, for example, a simple place where the surroundings are not enclosed. In an embodiment, the evacuation space 54 may be a space on which the evacuated flight device temporarily lands or a space in which the evacuated flight device stands by while floating. The evacuation space 54 is not necessarily limited to the cylindrical shape as illustrated in FIG. 1. The evacuation space 54 may include a curved surface or a flat surface, and may be spherical, elliptical, triangular pyramidal, quadrangular pyramidal, conical or other pyramidal shapes, or a combination of any other shapes. The evacuation space 54 is not necessarily limited to a three-dimensional shape, and may be a one-dimensional or a two-dimensional shape. The evacuation space 54 may partially include a space that continues infinitely (or continues to far). The evacuation space 54 needs only be large enough for the flight device to avoid the other flight device, and there are cases where the volume, area, etc. of the evacuation space 54 is smaller than, equal to and larger than the flight device. For example, suppose that the width of the structure 50 is L and the widths of the flight devices is S1 and S2, respectively, the width T of the evacuation space 54 needs only satisfy $T>S1+S2-L$. Here, the width T of the evacuation space 54 is a distance from the point where the evacuation space 54 is connected to the path 52 to the other end point of the evacuation space 54.

FIG. 1 illustrates an example where the structure 50 has only one evacuation space 54. In an embodiment, the structure 50 may have any number of evacuation spaces 54. In particular, when the path 52 is relatively long, the structure 50 may have a plurality of evacuation spaces 54. In this case, the structure 50 may have a plurality of evacuation spaces 54 at predetermined positions of the path 52, or at predetermined intervals in the path 52. Further, in the structure 50, the evacuation space 54 does not necessarily have to be formed as a separate part of the path 52. For example, in the structure 50, when the path 52 branches into two or more, at least one of the two or more branched paths 52 may be used as the evacuation space 54.

Moreover, as illustrated in FIG. 1, the structure 50 according to an embodiment may have the evacuation space 54 in the horizontal direction (e.g., the X-axis direction) with respect to the direction (e.g., the Y-axis direction) in which the flight device moves forward in the path 52. On the other hand, for example, there may be an aspect in which the structure 50 has the evacuation space 54 in a direction (e.g., the Z-axis direction) vertical to the direction (e.g., the Y-axis direction) in which the flight device moves forward in the path 52. In such a configuration, two flight devices temporarily overlap each other in the vertical direction when one flight device avoids the other flight device. When two flight devices overlap each other in the vertical direction, the wind pressure due to the lift generated by one flight device can affect the flight and/or floating of the other flight device. On the other hand, when the evacuation space 54 is disposed in the direction (e.g., the X-axis direction) horizontal to the direction (e.g., the Y-axis direction) in which the flight device moves forward on the path 52, the two flight devices will not overlap each other in the vertical direction. Thus, the risk that the wind pressure due to the lift generated by one flight device affects the flight and/or floating of the other flight device is reduced. Further, there may also be an aspect in which the evacuation space 54 is provided in any direction with respect to the direction (e.g., the Y-axis direction) in which the flight device moves forward in the path 52.

In this manner, as illustrated in FIG. 1, the structure 50 according to an embodiment may be a structure that forms at least partially the path 52 in which the flight device 1A flies. Further, the structure 50 according to an embodiment has the evacuation space 54 for the flight device 1A to avoid the other flight device 1B. In the structure 50 according to an embodiment, as illustrated in FIG. 1, the evacuation space 54 may be disposed horizontal to the path 52.

Further, in the path 52, when the flight device 1A and the flight device 1B evacuate in the evacuation space 54 at the same time, there is an increased risk of contact or collision between them in the evacuation space 54, Therefore, in an embodiment, when the flight device 1A and the flight device 1B face each other on the path 52, it is possible to control so that only either the flight device 1A or the flight device 1B evacuates to the evacuation space 54. In this case, it is possible to control so that the other flight device keeps its course in the path 52.

Further, when the flight device 1A and the flight device 1B according to an embodiment face each other in the path 52, which flight device is evacuated to the evacuation space 54 may be determined on the basis of various conditions. For example, when each of the flight device 1A and the flight device 1B can transmit its position in the path 52 to the outside, one may evacuate to the evacuation space 54 to avoid the other according to a predetermined priority. Here, the predetermined priority may be determined in advance in a control center that controls flying of the flight device, for example. Further, the predetermined priority may be appropriately determined according to a predetermined algorithm, for example, in the above-mentioned control center or the like, on the basis of various conditions of both the flight device 1A and the flight device 1B. Further, for example, when the flight device 1A and the flight device 1B are flying autonomously by autopilot, one flight device that has first detected the other may evacuate to the evacuation space 54 to avoid the other. Further, for example, when the flight device 1A and the flight device 1B are flying autonomously by autopilot, the one closer to the evacuation space 54 may evacuate to the evacuation space 54 to avoid the other. The conditions under which either the flight device 1A or the flight device 1B starts the avoidance action will be described later.

Next, the functional configuration of the flight device 1 according to an embodiment will be described.

Figure 2:
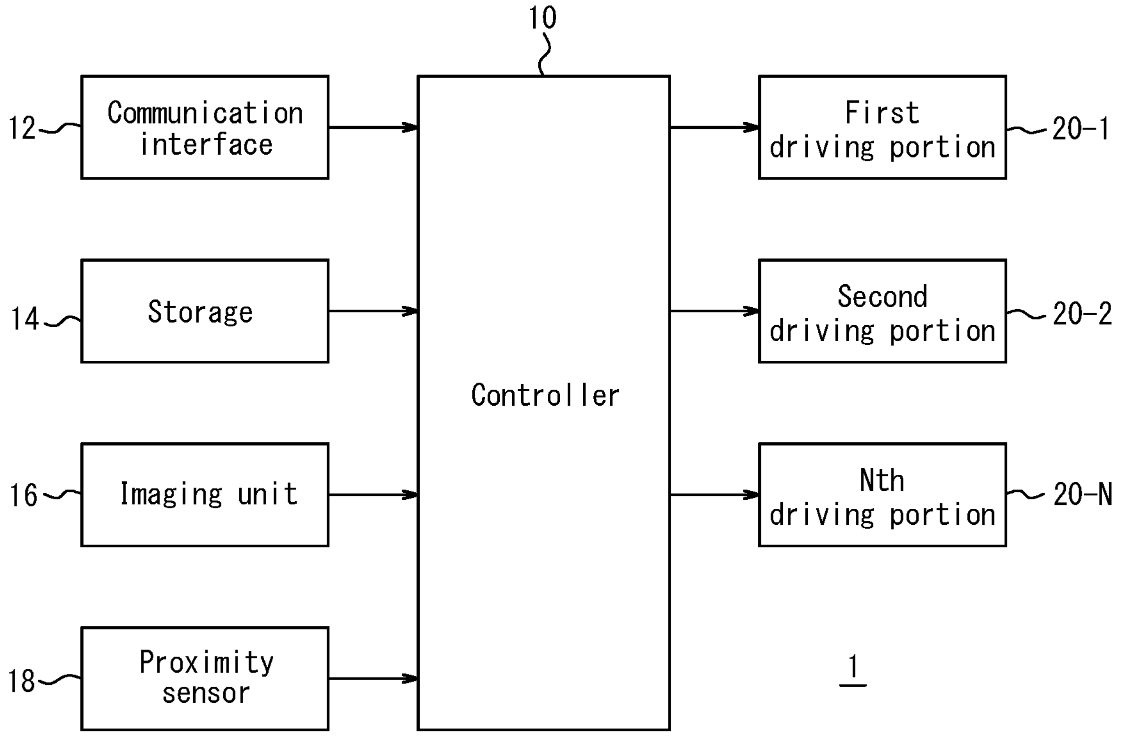
FIG. 2 is a functional block diagram schematically illustrating a configuration of the flight device according to an embodiment.

FIG. 2 is a functional block diagram schematically illustrating a configuration of the flight device 1 according to an embodiment. As illustrated in FIG. 2, the flight device 1 according to an embodiment includes, for example, a controller 10, a first driving portion 20-1, a second driving portion 20-2 and an Nth driving portion 20-N. Further, the flight device 1 according to an embodiment may appropriately include, for example, a communication interface 12, a storage 14, an imaging unit 16, a proximity sensor 18 and the like. The above described controller 10, communication interface 12 and storage 14 may be installed at or incorporated in any place of the flight device 1.

The controller 10 may include at least one processor, such as a Central Processing Unit (CPU), to provide control and processing power for executing various functions. The controller 10 may be realized collectively by one processor, realized by several processors, or by each individual processor. The processor may be realized as a single integrated circuit. The processor may be realized as a plurality of communicatively connected integrated circuits and discrete circuits. The processor may be realized on the basis of various other known techniques. In an embodiment, the controller 10 may be configured as a CPU and a program executed by the CPU, for example. The storage 14 may store a program executed by the controller 10, a result of the processing executed by the controller 10, and the like. Action of the controller 10 of the flight device 1 according to an embodiment will be described later.

The communication interface 12 can realize various functions including radio communication. The communication interface 12 may realize communication by various communication methods such as a Long Term Evolution (LTE). The communication interface 12 may include, for example, a modem whose communication system is standardized in the International Telecommunication Union Telecommunication Standardization Sector (ITU-T). Further, the communication interface 12 may realize radio communication by various methods such as WiFi or Bluetooth (registered trademark). The communication interface 12 may communicate with the communication interface of the flight device 1 by radio via an antenna, for example. Various kinds of information transmitted to and received by the communication interface 12 may be stored in the storage 14, for example. The communication interface 12 may be configured by including an antenna for transmitting and receiving radio waves, an appropriate RF portion, and the like. Since the communication interface 12 can be configured by a known technique for performing radio communication, more detailed description of hardware will be omitted.

The communication interface 12 may communicate, via an antenna, with an external device such as an external server or a cloud server, for example, by radio over the network. In an embodiment, the communication interface 12 may receive various kinds of information regarding the other flight device and/or the structure configured to form a path of the flight device from an external database such as an external server or a cloud server, for example. Further, in an embodiment, the communication interface 12 may transmit various kinds of information regarding the flight device 1, itself, to an external database such as an external server or a cloud server, for example. For example, the communication interface 12 may transmit the position information of the flight device 1 at a certain time to an external device.

Further, the communication interface 12 may be a functional portion for the flight device 1 to communicate with the other flight device by radio. In this case, the communication interface 12 may transmit various kinds of information regarding the flight device 1 itself to the other flight device. For example, the communication interface 12 may transmit the position information of the flight device 1 itself at a certain time to the other flight device. Moreover, the communication interface 12 may receive various kinds of information regarding the other flight device from the other flight device. For example, the communication interface 12 may receive the position information of the other flight device at a certain time from the other flight device.

The storage 14 stores various kinds of information obtained from the controller 10, the communication interface 12, and the like. Further, the storage 14 stores a program and the like executed by the controller 10. Besides, the storage 14 also stores various kinds of data such as a result of operation by the controller 10, for example. Explanation will be given below assuming that the storage 14 can also include a work memory and the like when the controller 10 operates.

The storage 14 can be configured by, for example, a semiconductor memory, a magnetic disk, or the like, but is not limited thereto and can be any storage device. The storage 14 may also be a memory medium such as a memory card inserted into the flight device 1 according to this embodiment. Further, the storage 14 may be an internal memory of the CPU used as the controller 10.

The imaging unit 16 may be composed of various imaging devices such as a CCD image sensor. The imaging unit 16 may be a camera device for the flight device 1 to perform aerial photography. The imaging unit 16 may be attached to the flight device 1 such that it faces outward. The imaging unit 16 can capture a still image or a moving image with the flight device 1 as a viewpoint. Data of a still image or a moving image captured by the imaging unit 16 may be supplied to the controller 10 or stored in the storage 14. Since the imaging unit 16 can be configured by a known technique for capturing images, such as a digital camera, for example, a more detailed description of hardware will be omitted. The imaging unit 16 may be installed in any number and in any shape as needed. Further, in an embodiment, if the flight device 1 can grasp the positions of the flight device 1 and other flight devices in some detail by communication or other means, for example, the imaging unit 16 may not be provided.

The imaging unit 16 may capture a still image or a moving image of the other flight device that is flying and/or floating in front of the flight device 1, for example. The controller 10 may determine the distance between the flight device 1 and the other flight device on the basis of thus captured still image or moving image of the other flight device. Hereinafter the distance between the flight device 1 according to an embodiment (e.g. the flight device 1A) and the other flight device (e.g. the flight device 1B) will be referred to as the "distance between devices" as appropriate.

Further, the imaging unit 16 may capture a still image or a moving image of an inner wall of the path 52 surrounding the flight device 1 when the flight device 1 flies along the path 52 of the structure 50. Moreover, when the flight device 1 evacuates to the evacuation space 54 of the structure 50, the imaging unit 16 may capture a still image or a moving image of the inner wall of the evacuation space 54 surrounding the flight device 1. The controller 10 may determine the distance between the flight device 1 and the inner wall on the basis of thus captured still image or moving image of the inner wall of the path 52 or of the evacuation space 54. The controller 10 may control flying and/or floating of the flight device 1 on the basis of thus determined distance to prevent the flight device 1 from coming in contact with the inner wall of the path 52 or of the evacuation space 54.

The proximity sensor 18 detects the presence or absence of a predetermined object approaching the flight device 1, and/or the degree to which the predetermined object approaches the flight device 1. The data about the approach to the flight device 1 detected by the proximity sensor 18 may be supplied to the controller 10 or stored in the storage 14. The proximity sensor 18 may be an ultrasonic sensor or an infrared sensor, for example. However, the proximity sensor 18 may be any device capable of detecting the presence or absence of a predetermined object approaching the flight device 1 and/or the degree to which the predetermined object approaches the flight device 1. Hereinafter, as an example of the proximity sensor 18, an example in which an ultrasonic sensor is adopted will be described. Since the proximity sensor 18 can be configured by various known techniques for detecting an approach of an object, a more detailed description of hardware will be omitted.

When the proximity sensor 18 is an ultrasonic sensor, the proximity sensor 18 can detect the presence or absence of the object and the distance to the object by transmitting ultrasonic waves toward the object by a transmitter and receiving the reflected wave by a receiver. Specifically, a distance from the proximity sensor 18 to the object is calculated by calculating the relationship between the time required from transmission of ultrasonic wave to reception thereof and the sonic speed.

The proximity sensor 18 may detect approach of a predetermined object such as the other flight device approaching from the front of the flight device 1. For example, the proximity sensor 18 may detect that the distance between the proximity sensor 18 and the predetermined object is a predetermined distance or less. The proximity sensor 18 may also detect approach of the inner wall of the path 52 surrounding the flight device 1 when the flight device 1 flies along the path 52 of the structure 50. Moreover, the proximity sensor 18 may detect the approach of the inner wall of the evacuation space 54 surrounding the flight device 1 when the flight device 1 evacuates to the evacuation space 54 of the structure 50. For example, the proximity sensor 18 may detect that the distance between the proximity sensor 18 and the inner wall is a predetermined distance or less. The controller 10 may control flying and/or floating of the flight device 1 such that the flight device 1 will not come in contact with the inner wall of the path 52 or the evacuation space 54 on the basis of thus detected results.

The first driving portion 20-1, the second driving portion 20-2 and the Nth driving portion 20-N may be composed of a motor or the like that is rotationally driven by the electric power. Hereinafter, when the first driving portion 20-1, the second driving portion 20-2 and the Nth driving portion 20-N are not distinguished, they may be simply referred to as the "driving portions 20."

The driving portions 20 rotationally drive the propellers of the flight device 1. More specifically, the first driving portion 20-1 rotationally drives the first propeller of the flight device 1, for example. Further, the second driving portion 20-2 rotationally drives the second propeller of the flight device 1, for example. Similarly, the Nth driving portion 20-N rotationally drives the Nth propeller of the flight device 1, for example. Here, N may be an integer equal to or greater than 1. The number of driving portions 20 provided to the flight device 1 may correspond to the number of propellers provided to the flight device 1. For example, as with the flight device 1 illustrated in FIG. 1, when four propellers are provided, the number of driving portions 20 provided to the flight device 1 may also be four (N=4).

In an embodiment, the controller 10 may control the flight and/or the floating of the flight device 1 by controlling the number of rotations of the driving portions 20 per unit time and the like. For example, the controller 10 can allow the flight device 1 to rise by controlling so that all of the driving portions 20 increase their rotational speeds in a uniformed manner. Further, for example, the controller 10 can allow the flight device 1 to descend by controlling so that all of the driving portions 20 decrease their rotational speeds in a uniformed manner. Moreover, the controller 10 can change the traveling direction of the flight device 1 by controlling so that the rotational speeds of a plurality of driving portions 20 are different from each other. Control of the flight device 1 when flying with its propellers can employ various known techniques, and thus a more detailed description will be omitted.

In an embodiment, the driving portions 20 rotationally drive not only propellers. In an embodiment, the driving portions 20 may rotationally drive blades or rotors, for example. That is, the driving portions 20 may be functional portions that drive any element that generates power such as lift and/or propulsion, for example, when the flight device 1 flies and/or floats.

Figure 3:
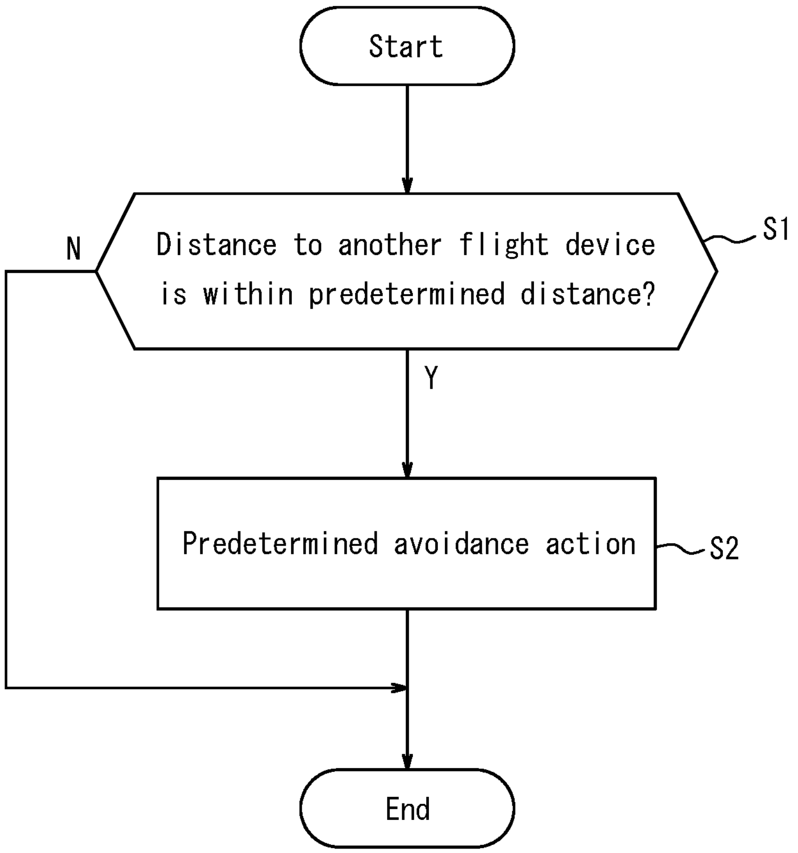
FIG. 3 is a flowchart illustrating an action of the flight device according to an embodiment.

Next, an action of the flight device 1 according to an embodiment will be described. FIG. 3 is a flowchart describing the action of the flight device 1 according to an embodiment.

First, a case where the flight device 1 is not flying in the path 52 of the structure 50, for example, a case where the flight device 1 is flying in the air where the path 52 is not surrounded will be described. This situation corresponds to the case where it is assumed that the structure 50 is not present in FIG. 1, for example.

It is assumed that the controller 10 of the flight device 1 (e.g., the flight device 1A) according to an embodiment has already controlled the driving portions 20 to rotationally drive at the time when the action illustrated in FIG. 3 is started. That is, at the time when the action illustrated in FIG. 3 is started, it is assumed that the flight device 1 (e.g., the flight device 1A) according to an embodiment is already flying and/or floating.

Further, at the time when the action illustrated in FIG. 3 is started, it is assumed that the other flight device (e.g., the flight device 1B) is already flying and/or floating. Moreover, it is assumed that the flight device 1B is flying and/or floating in the traveling direction of the flight device 1A. That is, it is assumed that the flight device 1B is present in front of the flight device 1A. Further, at this point of time, it is assumed that the flight device 1B is some distance from the flight device 1A.

When the action illustrated in FIG. 3 is started, the controller 10 of the flight device 1 (e.g., the flight device 1A) according to an embodiment determines whether or not a distance to the other flight device (e.g., the flight device 1B) is within a predetermined distance (step S1). As described above, the distance from the flight device 1 (e.g., the flight device 1A) according to an embodiment to the other flight device (e.g., the flight device 1B) may also be referred to as the "distance between devices."

In step S1, the "predetermined distance" may be, for example, a distance that allows the flight device 1A to be able to afford to perform an action (avoidance action) without coming into contact with or colliding with the flight device 1B. In an embodiment, the controller 10 may appropriately set the predetermined distance to, for example, 3 m or 5 m. The controller 10 may obtain the predetermined distance from an external database. Further, the controller 10 may calculate the predetermined distance according to a predetermined algorithm. At this time, if the controller 10 can refer to the information about the other flight device to avoid, that is, the flight device 1B, the controller 10 may calculate the predetermined distance by also taking that information into consideration.

Further, when the controller 10 determines the distance between devices in step S1, the flight device 1A may receive the information on the position of the flight device 1B by using the communication interface 12, for example. In this case, the controller 10 can determine the distance between devices on the basis of the received position of the flight device 1B and the position of the flight device 1A, which is own device. Further, when the controller 10 determines the distance between devices in step S1, the flight device 1A may detect approach of the flight device 1B by the proximity sensor 18, for example. Moreover, when the controller 10 determines the distance between devices in step S1, the flight device 1A may determine on the basis of a still image or a moving image of the flight device 1B captured by the imaging unit 16, for example.

When it is determined that the distance between devices is not within the predetermined distance in step S1, the controller 10 determines that no avoidance action is required at this time, and finishes the processing illustrated in FIG. 3. On the other hand, when it is determined that the distance between devices is within the predetermined distance in step S1, the controller 10 determines that the avoidance action is required, and performs the processing of step S2.

In step S2, the controller 10 controls the flight device 1A to perform a predetermined avoidance action. Here, the predetermined avoidance action may be various kinds of actions. For example, when the flight device 1A can obtain the information on the course of the flight device 1B, the predetermined avoidance action may be an action by the flight device 1A to avoid the course of the flight device 1B. Further, for example, the predetermined avoidance action may be determined in advance as an action to change the course to the right in all flight devices including the flight device 1A and the flight device 1B. In this case, for example, even if both the flight device 1A and the flight device 1B cannot obtain the course information to each other, they can avoid each other.

In this manner, the flight device 1 (flight device 1A) according to an embodiment performs a predetermined avoidance action to avoid the flight device 1B on the basis of a determination in which a distance to the other flight device (flight device 1B) is within the predetermined distance. Further, the flight device 1A according to an embodiment may include the controller 10 configured to control to perform a predetermined avoidance action to avoid the flight device 1B on the basis of a determination of the distance between devices. In this case, the controller 10 may determine whether or not the distance to the flight device 1B is within the predetermined distance on the basis of the information on the position of the flight device 1A and the information on the position of the other flight device 1B received by the communication interface 12. Further, in the above described case, the controller 10 may determine the distance between devices on the basis of the results detected by the proximity sensor 18.

The relative positional relationship between the flight device 1A and the flight device 1B can change from moment to moment. Therefore, the action illustrated in FIG. 3 may be controlled so that a series of actions from step S1 to step S2 is repeated. That is, the controller 10 may restart the processing of step S1 immediately after the action illustrated in FIG. 3 ends or after a predetermined time has elapsed.

As described above, according to the flight device 1 of an embodiment, the risk of contact or collision between the flight device 1A and the flight device 1B while they are flying and/or floating can be reduced. Therefore, according to an embodiment, a flight device that contributes to safety and convenience can be provided.

Next, the other action of the flight device 1 according to an embodiment will be described. Action of the flight device 1 according to an embodiment will be described with reference to the flowchart illustrated in FIG. 3 again. Hereinafter, contents different from the above description will be mainly described, and contents similar to the above description will be simplified or omitted as appropriate.

Here, a case where the flight device 1 is flying in the path 52 of the structure 50 will be described. This situation corresponds to the case where the structure 50 is present in FIG. 1, for example.

At the time when the action illustrated in FIG. 3 is started, it is assumed that the flight device 1 (e.g., the flight device 1A) according to an embodiment is already moving forward (in the Y-axis positive direction) in the path 52 of the structure 50. Further, at the time when the action illustrated in FIG. 3 is started, it is assumed that the other flight device (e.g., the flight device 1B) is already moving forward (in the Y-axis negative direction) in the path 52 of the structure 50. Further, at this point of time, it is assumed that the flight device 1B is present in front of the flight device 1A and is apart from the flight device 1A to some extent.

When the action illustrated in FIG. 3 is started, the controller 10 of the flight device 1 (e.g., the flight device 1A) according to an embodiment determines whether or not the distance between the devices is within the predetermined distance (step S1).

When it is determined that the distance between the devices is not within the predetermined distance in step S1, the controller 10 determines that it is not necessary to perform the avoidance action at this time, and finishes the processing illustrated in FIG. 3. On the other hand, when it is determined that the distance between the devices is within the predetermined distance in step S1, the controller 10 determines that it is necessary to perform the avoidance action, and performs the processing of step S2.

In step S2, the controller 10 controls the flight device 1A to perform a predetermined avoidance action. Here, the predetermined avoidance action may be, for example, an action for the flight device 1A to move to the evacuation space 54 to evacuate. In order to perform the control of step S2, at least the information on the position of the evacuation space 54 existing around the flight device 1A may be stored in the storage 14 of the flight device 1A. The information on the position where the evacuation space 54 is present in the path 52 that the flight device 1A, for example, is scheduled to fly may be stored in advance in the storage 14 of the flight device 1A. Further, the controller 10 of the flight device 1A may obtain the information on the position via the communication interface 12 when the information on the position of the nearest evacuation space 54 is needed, for example.

In this manner, in the flight device 1 (flight device 1A) according to an embodiment, the controller 10 may control the flight device 1A to move to the evacuation space 54 to evacuate, as a predetermined avoidance action. In this case, the storage 14 of the flight device 1A may store the information on the position of the evacuation space 54. Further, the controller 10 may read out the information on the position of the evacuation space 54 from the storage 14 and controls the flight device 1A to move to the evacuation space 54.

As described above, according to the flight device 1 of an embodiment, the risk of contact or collision between the flight device 1A and the flight device 1B while they are flying and/or floating in the path 52 of the structure 50 can be reduced. Further, according to an embodiment, the flight device 1A and the flight device 1B can reduce the mutual interference with the external environment as described above by flying and/or floating in the path 52 of the structure 50. Therefore, according to an embodiment, a flight device that contributes to safety and convenience can be provided.

Hereinafter the other features of the flight device 1 according to an embodiment will be described.

In the above-described embodiment, the flight device 1 has been described on the assumption that it autonomously flies or floats by autopilot. However, the flight device 1 according to an embodiment does not fly or float autonomously by autopilot, and may be remotely controlled by a host computer, for example, at a control center or a management center that controls the flight of the flight device, for example.

In the description of the above described embodiment, the case has been described in which a predetermined avoidance action for avoiding the other flight device is performed on the basis of the determination that the distance to the other flight device will be within the predetermined distance. However, this disclosure is not limited thereto. For example, the flight device according to this disclosure may perform a predetermined avoidance action of avoiding the other flight device on the basis of the determination that the distance to the other flight device has become within the predetermined distance.

In this manner, the flight device 1 (flight device 1A) according to an embodiment may be remotely controlled to perform a predetermined avoidance action to avoid the other flight device 1B on the basis of the determination of the distance between the devices. According to the above described flight device 1A, even if the flight device 1A cannot fly or float autonomously by autopilot, the risk of contact or collision between the flight device 1A and the flight device 1B while they are flying and/or floating can be reduced. Therefore, according to an embodiment, a flight device that contributes to safety and convenience can be provided.

Although this disclosure has been described on the basis of the drawings and examples, it is to be noted that various changes and modifications can be easily made by those skilled in the art on the basis of this disclosure. Therefore, such changes and modifications are to be understood as included within the scope of this disclosure. For example, the functions and the like included in each functional portion may be rearranged in any logically consistent way. Further, a plurality of functional portions or the like may be combined into one or divided. Each embodiment according to the above described disclosure is not limited to being faithfully implemented in accordance with the above described each embodiment, and may be implemented by appropriately combining each feature or omitting a part thereof as appropriate.

The above described embodiment is not limited to only an implementation as the flight device 1. For example, the above described embodiment may be implemented as a method for controlling a device such as the flight device 1. Moreover, for example, the above described embodiment may be implemented as a program for controlling a device such as the flight device 1.

According to the above described embodiment, a structure may be configured to form at least partially a flight path of a flight device, wherein the structure has an evacuation space for the flight device to avoid another flight device. With the structure, the evacuation space may be disposed horizontal to the path. With the structure, when a width of the structure is L, a width of the flight device is S1, and a width of the other flight device is S2, a width T of the evacuation space 54 may satisfy $T>S1+S2-L$. With the structure, a part or all of the structure may be buried in ground.

REFERENCE SIGNS LIST

- 1 Flight device
- 10 Controller
- 12 Communication interface
- 14 Storage
- 16 Imaging unit
- 18 Proximity sensor
- 20 Driving portion
- 50 Structure
- 52 Path
- 54 Evacuation space

The invention claimed is:

1. A flight device configured to perform, on the basis of a determination that the flight device is within a structure and that a distance to another flight device that is within the structure is within a predetermined distance, an avoidance action of avoiding the other flight device, wherein the flight device comprises a storage in which information on a position of an evacuation space is stored, the evacuation space having a width based on a width of the flight device, a width of the other flight device and a width of the structure, and the flight device is configured to control, as the avoidance action, such that the flight device moves to the evacuation space to evacuate.

2. The flight device according to claim 1, comprising a controller configured to perform the avoidance action of avoiding the other flight device on the basis of the determination.

3. The flight device according to claim 2, comprising a communication interface configured to receive information on a position of the other flight device, wherein, the controller performs a determination as to whether or not a distance to the other flight device is within the predetermined distance on the basis of information on a position of the flight device and information on the position of the other flight device received by the communication interface.

4. The flight device according to claim 2, comprising a proximity sensor configured to detect approach of the other flight device, wherein the controller performs the determination on the basis of a result detected by the proximity sensor.

5. The flight device according to claim 1, wherein the flight device is remotely controlled to perform the avoidance action to avoid the other flight device on the basis of the determination.

6. The flight device according to claim 1, wherein the evacuation space is provided to the structure for the flight device to evacuate.

7. A method for controlling a flight device, comprising:

a determination step of determining whether or not the flight device is within a structure and that a distance from the flight device to another flight device that is within the structure is within a predetermined distance;

a storing step of storing, in a storage, information on a position of an evacuation space having a width based on a width of the flight device, a width of the other flight device and a width of the structure; and an avoidance step of performing, on the basis of a determination in the determination step, an avoidance action in which the flight device avoids the other flight device such that the flight device moves to the evacuation space to evacuate.

8. A non-transitory computer-readable recording medium storing computer program instructions, which when executed by a flight device, cause a computer to execute:

determine a determination of whether or not the flight device is within a structure and that a distance from the flight device to another flight device that is within the structure is within a predetermined distance;

store, in a storage, information on a position of an evacuation space having a width based on a width of the flight device, a width of the other flight device and a width of the structure; and perform, on the basis of the determination an avoidance action in which the flight device avoids the other flight device such that the flight device moves to the evacuation space to evacuate.

* * * * *